(12) United States Patent
Kamai, III

(10) Patent No.: US 11,344,013 B1
(45) Date of Patent: May 31, 2022

(54) FISHOOK AND LINE HOLDER, FISHING POLE WITH HOLDER, KIT AND METHOD

(71) Applicant: Frederick Kamai, III, Laguna Niguel, CA (US)

(72) Inventor: Frederick Kamai, III, Laguna Niguel, CA (US)

(*) Notice: Subject to any disclaimer, the term of this patent is extended or adjusted under 35 U.S.C. 154(b) by 437 days.

(21) Appl. No.: 16/425,002

(22) Filed: May 29, 2019

Related U.S. Application Data

(60) Provisional application No. 62/722,673, filed on Aug. 24, 2018, provisional application No. 62/677,592, filed on May 29, 2018.

(51) Int. Cl.
| | | |
|---|---|---|
| A01K 87/04 | (2006.01) |
| A01K 87/06 | (2006.01) |
| A01K 87/02 | (2006.01) |
| A01K 89/015 | (2006.01) |

(52) U.S. Cl.
CPC .............. *A01K 87/04* (2013.01); *A01K 87/06* (2013.01); *A01K 87/02* (2013.01); *A01K 89/01925* (2015.05)

(58) Field of Classification Search
CPC ................................. A01K 87/04; A01K 87/06
See application file for complete search history.

(56) References Cited

U.S. PATENT DOCUMENTS

| | | | | |
|---|---|---|---|---|
| 1,662,983 A * | 3/1928 | Pflueger | ................. | A01K 97/06 43/25.2 |
| 2,028,477 A * | 1/1936 | Rupp | ..................... | A01K 87/00 43/25.2 |
| 2,514,645 A * | 7/1950 | Jardine | ................. | A01K 87/00 43/25.2 |
| 3,411,232 A * | 11/1968 | Rumbaugh | ............ | A01K 87/00 43/25.2 |
| 3,641,696 A * | 2/1972 | Fleischer | ............... | A01K 87/04 43/24 |
| 3,665,635 A * | 5/1972 | Lumbard | ............... | A01K 97/06 43/25.2 |
| 3,701,571 A * | 10/1972 | Eck | ......................... | F16C 17/10 384/418 |
| 5,531,041 A * | 7/1996 | Betto | ..................... | A01K 87/04 43/24 |
| 6,408,563 B1 * | 6/2002 | Van Scoy | ............. | A01K 87/00 43/25.2 |
| 8,813,416 B2 * | 8/2014 | Hudson | .................. | A01K 97/06 43/25.2 |

(Continued)

*Primary Examiner* — Jessica B Wong
(74) *Attorney, Agent, or Firm* — John J. Connors; Connors & Assoc.

(57) ABSTRACT

A fishing pole is disclosed including a component having integral therewith a fishhook and line holder. The fishhook and line holder has a hook keeper element with a terminal end displaced from a surface of the component and configured to form a space that receives a portion of a fishhook gripping the hook keeper element. The holder also has a line keeper element extending outward from the hook keeper element. The line keeper element includes a groove configured to retain a free end portion of a fishing line extending from a reel mounted to the pole. An elastic retention member seated in the groove secures the free end portion therein, holding this portion immovable in place. The fishhook and line holder may be a separate module that is attached to a section of a conventional fishing pole.

17 Claims, 11 Drawing Sheets

(56) References Cited

U.S. PATENT DOCUMENTS

| | | | |
|---|---|---|---|
| 2006/0090388 A1* | 5/2006 | Lee | A01K 87/04 43/24 |
| 2012/0255215 A1* | 10/2012 | Cooper | A01K 87/08 43/20 |
| 2016/0057985 A1* | 3/2016 | Farrington | A01K 89/0155 43/4.5 |
| 2019/0150416 A1* | 5/2019 | Jeffery | A01K 87/04 |
| 2019/0159438 A1* | 5/2019 | Stirling | A01K 87/04 |
| 2020/0323186 A1* | 10/2020 | Bellebono | A01K 87/04 |

\* cited by examiner

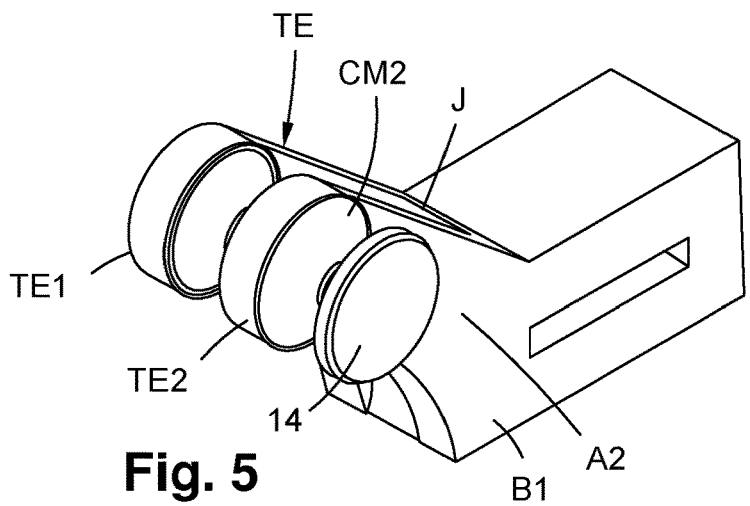
Fig. 5
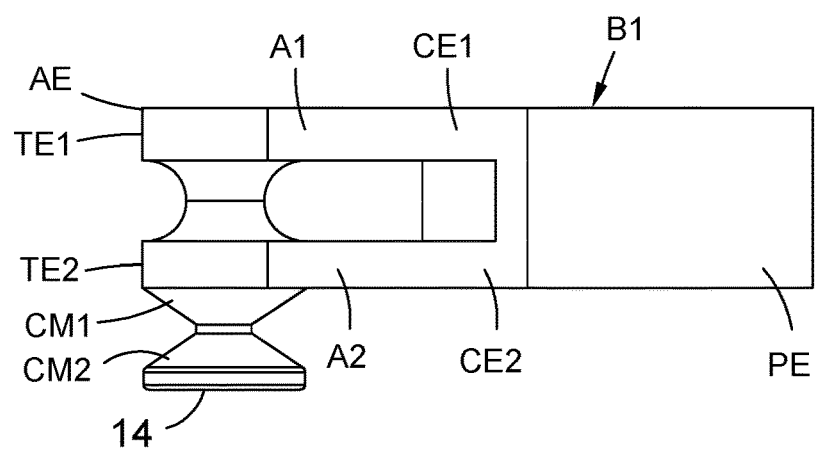
Fig. 5A
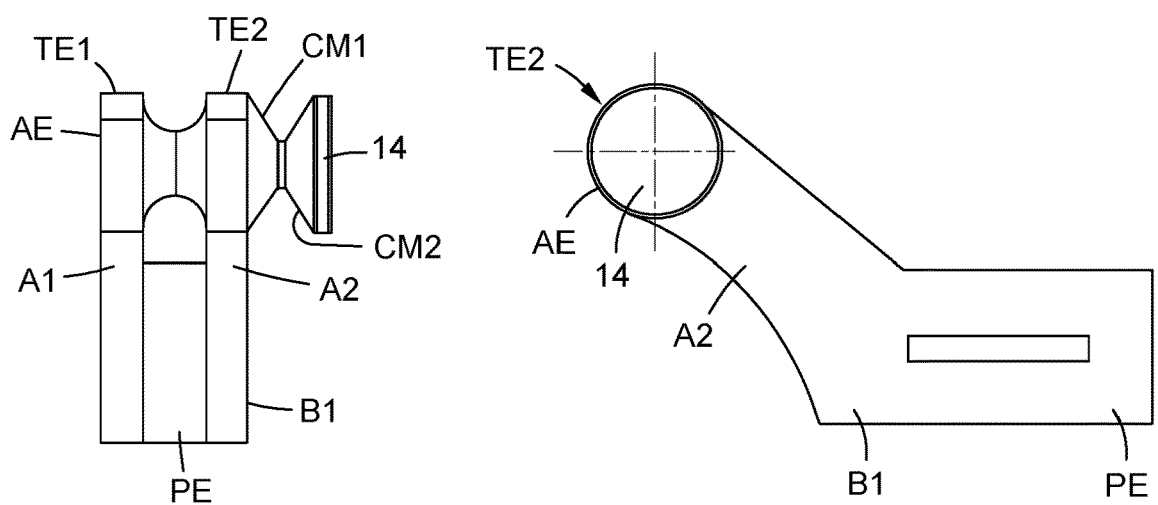
Fig. 5B
Fig. 5C

FISHOOK AND LINE HOLDER, FISHING POLE WITH HOLDER, KIT AND METHOD

RELATED PATENT APPLICATIONS & INCORPORATION BY REFERENCE

This is a Non-provisional Utility application, that claims priority based on, U.S. Provisional Patent Application No. 62/677,592, entitled "FISHHOOK AND LINE HOLDER, FISHING POLE WITH HOLDER, KIT AND METHOD," filed May 29, 2018, and U.S. Provisional Patent Application No. 62/722,673, entitled "FISHHOOK AND LINE HOLDER, FISHING POLE WITH HOLDER, KIT AND METHOD," filed Aug. 24, 2018. These related patent applications are incorporated herein by reference and made a part of this application. If any conflict arises between the disclosure of the invention in this application and that in the related patent applications, the disclosure in this application shall govern. Moreover, any and all U. S. patents, U. S. patent applications, and other documents, hard copy or electronic, cited or referred to in this application are incorporated herein by reference and made a part of this application.

Definitions

The words "comprising," "having," "containing," "holding," and "including," and other grammatical forms thereof, are intended to be equivalent in meaning and be open ended in that an item or items following any one of these words is not meant to be an exhaustive listing of such item or items, nor meant to be limited to only the listed item or items. The word "line" includes any flexible and elongated cable, cord, string, rope and any like item employing mono or multi filament braided or unbraided, one or multiple strands of material.

The word "kit" is any assembly of two of more disconnected parts of my fishhook and line holder.

The word "rectangular" includes square.

BACKGROUND

Conventionally, a fishhook is connected to a fishing line extending from a fishing reel attached to a fishing pole either directly tied to a free terminal end of the line or indirectly through a lure or jig. When the fishing line breaks or is cut when bringing a fish on board a boat, the cut, free end of the fishing line may be entangled with other equipment. This is both inconvenient and can even cause accidents. My fishhook and line holder eliminates these and other problems associated with a broken or cut fishing line. It also provides a convenient and safe way to attach a replacement fishhook directly or indirectly to a free end of a broken or cut fishing line and to store the fishhook attached to the line while not in use.

SUMMARY

My fishhook and line holder, fishing pole with holder, kit and method have one or more of the features depicted in the embodiments discussed in the section entitled "DETAILED DESCRIPTION OF SOME ILLUSTRATIVE EMBODIMENTS."

Briefly, my fishhook and line holder has a hook keeper element with a terminal end displaced from a surface of a body member. The body member is configured to form a space that receives a portion of a fishhook gripping the hook keeper element. My holder also has a line keeper element extending outward from the hook keeper element. The line keeper element includes a groove configured to retain a free end portion of a fishing line extending from a reel mounted to a fishing pole. An elastic retention member, for example, an "O" ring, is seated in the groove, which may be annular. This secures the free end portion in the groove, holding this portion immovable and in place. This enables an angler to attach a fishhook at a cut or broken tip of the free end portion of the fishing line while the line is securely attached to the line keeper element. The fishhook and line holder may be a separate module that is attached to a section of a conventional fishing pole or integral with a conventional fishing pole.

DESCRIPTION OF THE DRAWING

Some embodiments of my fishhook and line holder are discussed in detail in connection with the accompanying drawing, which is for illustrative purposes only. This drawing includes the following figures (Figs.), with like numerals and letters indicating like parts:

FIG. 5 is a perspective view of one embodiment of a body member of my fishhook and line holder.

FIG. 5A is a top plan view of the embodiment of the body member of my holder shown in FIG. 5.

FIG. 5B is a front end view of the embodiment of the body member of my holder shown in FIG. 5.

FIG. 5C is a side view of the embodiment of the body member of my holder shown in FIG. 5.

DETAILED DESCRIPTION OF SOME ILLUSTRATIVE EMBODIMENTS

General

Figure 1:
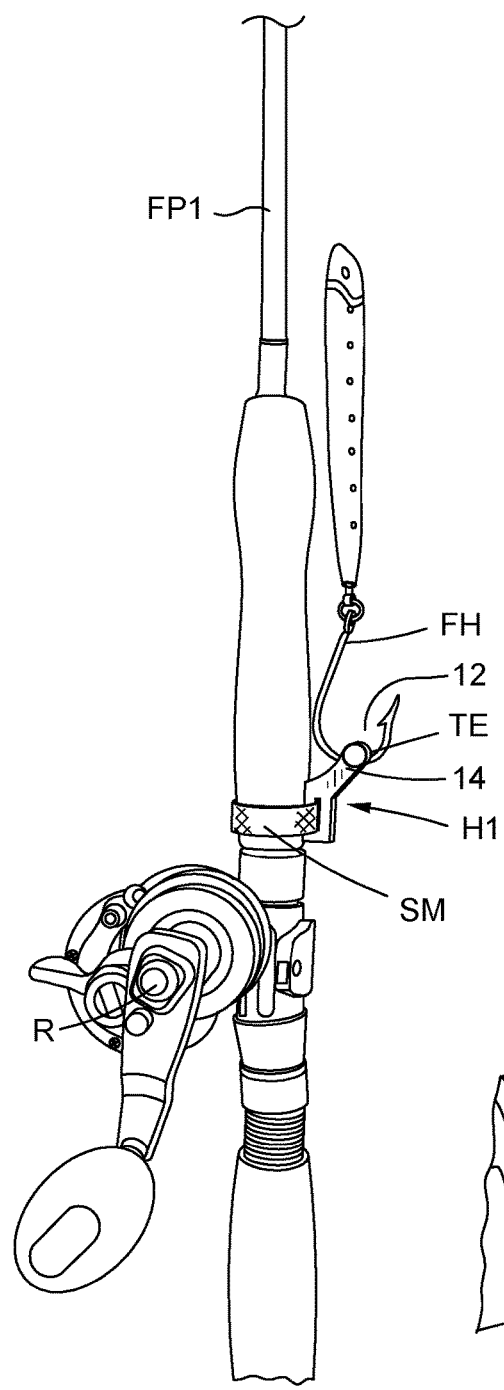
FIG. 1 is a perspective view of a fishing pole including one embodiment of my fishhook and line holder configured to be detachably mounted on a fishing pole.

The several embodiments, subsequently discussed in detail, all employ a fishhook and line holder having a hook keeper element 12 with a terminal end TE displaced from a surface S1 of the embodiment and configured to form an open space OS that receives a tip portion TP of a fishhook FH gripping the hook keeper element 12. As shown in FIG. 1, the fishhook FH is attached at an end of the fishing line indirectly through a lure. A line keeper element 14 extends outward from the terminal end TE. The line keeper element 14 includes a groove G configured to retain a free end portion EP of a fishing line FL extending from a reel R. An elastic retention member 18 is seated in the groove G. In the illustrated embodiments, the groove G may be annular and the elastic retention member 18 may be an "O" ring seated in the annular groove. The embodiments include a modular fishhook and line holder H1 (FIGS. 1 through 5E), a modular fishhook and line holder H2 (FIG. 6), fishing pole components C1 (FIGS. 7 through 7B) and C2 (FIGS. 8 through 9), C3 (FIGS. 11 through 15, and kit K (FIG. 10).

FIGS. 1 through 6A

Figure 6:
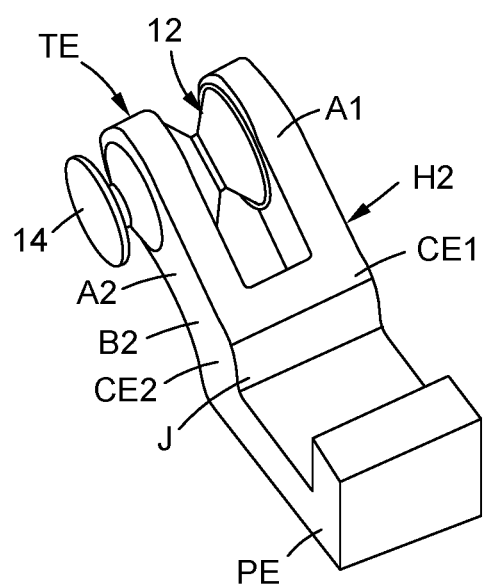
FIG. 6 is a perspective view of another embodiment of a body member of my fishhook and line holder.

As depicted in FIGS. 1 through 4, the modular fishhook and line holder H1 is detachably mounted on a conventional fishing pole FP1 (FIG. 1) by means of a strap member SM passing through a passageway PW open at opposed ends. As shown in FIG. 6, the platform end PE of the modular fishhook and line holder H2 is configured to retain the strap member SM in an open channel OC that receives a central segment of the strap member. The strap member SM may have a hook member at one opposed strap end and a loop element at the other opposed strap end, enabling the strap member to wrap around the fishing pole FP1 and then connect the opposed ends to detachably mount the modular fishhook and line holder H1. A locking connection at the opposed strap ends may be employed instead of a hook and fabric connection to permanently fasten the modular fishhook and line holder H1 to the conventional fishing pole FP1. Additionally, the strap member SM may employ a buckle B to fasten the modular fishhook and line holder H1 or H2.

This modular fishhook and line holder H1 comprises a body member B1 including a platform end PE and an elevated arm end AE. The body member B1 is a rigid, block-type, unitary component, for example, a molded part made of a plastic such as, for example, polypropylene. The platform end PE and elevated arm end AE join at a junction J (FIGS. 5 and 6), merging, and being integral with each other. The platform end PE is configured to retain the strap member SM that can be wrapped around a portion of the fishing pole FP1 to which the holder H1 or H2 is to be attached. The holders H1 or H2, as the case may be, are attached to the fishing pole FP1 nearby the reel R, to thereby detachably mount the holder to the fishing pole.

As best illustrated in FIGS. 5 and 5A through 5E, the elevated arm end AE has a pair of opposed, spaced apart arms A1 and A2, each arm having terminal end TE1 and TE2 and a connection end CE1 and CE2. The connection ends CE1 and CE2 merge, and are integral with, the platform end PE at the junction J. The terminal ends TE1 and TE2 are remote from the junction J and are displaced generally from the surface S1 of a section of the fishing pole FP1 to which the holder H1 is mounted. The arms A1 and A2 are parallel, spaced apart, in registration with each other, have a length from ½ to ¾ inches, and are spaced apart a distance from ⅛ to ¼ inch. An acute angle from 30 to 50 degrees is formed between the surface S1 of the fishing pole section and the arms A1 and A2 at their intersection at the junction J. The terminal ends TE1 and TE2 of the holder H1 are displaced from ⅞ to 1⅛ inches from the surface S1.

Figure 2:
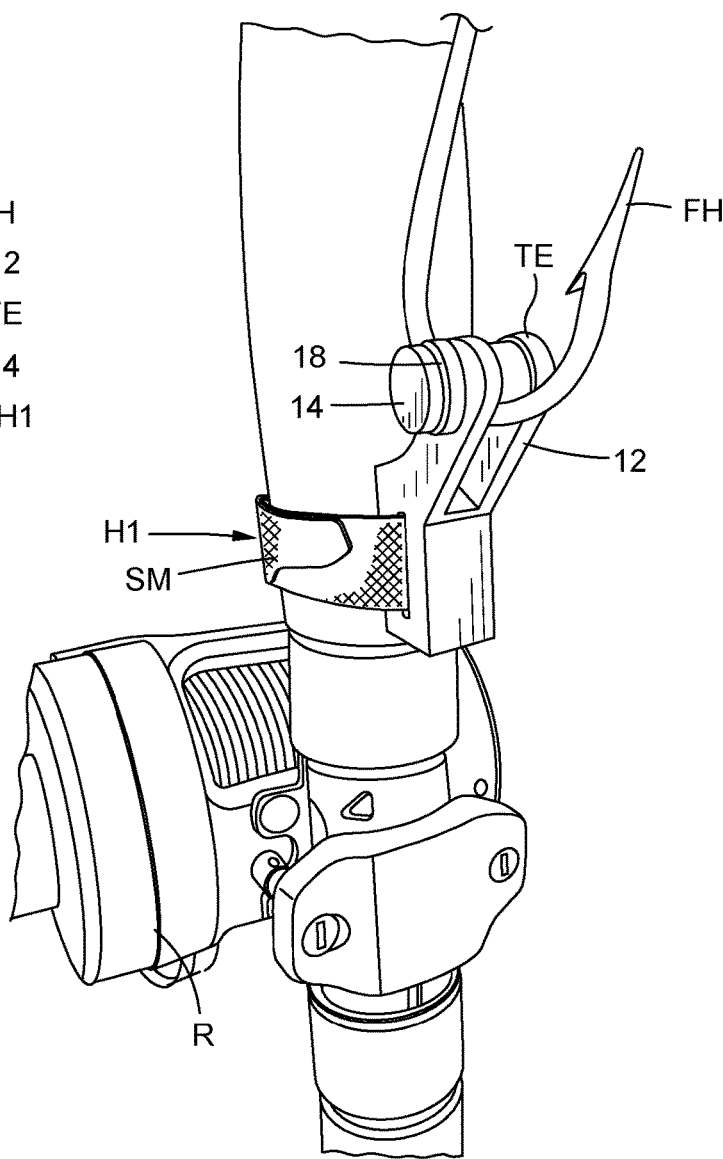
FIG. 2 is a fragmentary, enlarged perspective view of a portion of the fishing pole shown in FIG. 1 carrying my detachable fishhook and line holder.
Figure 2A:
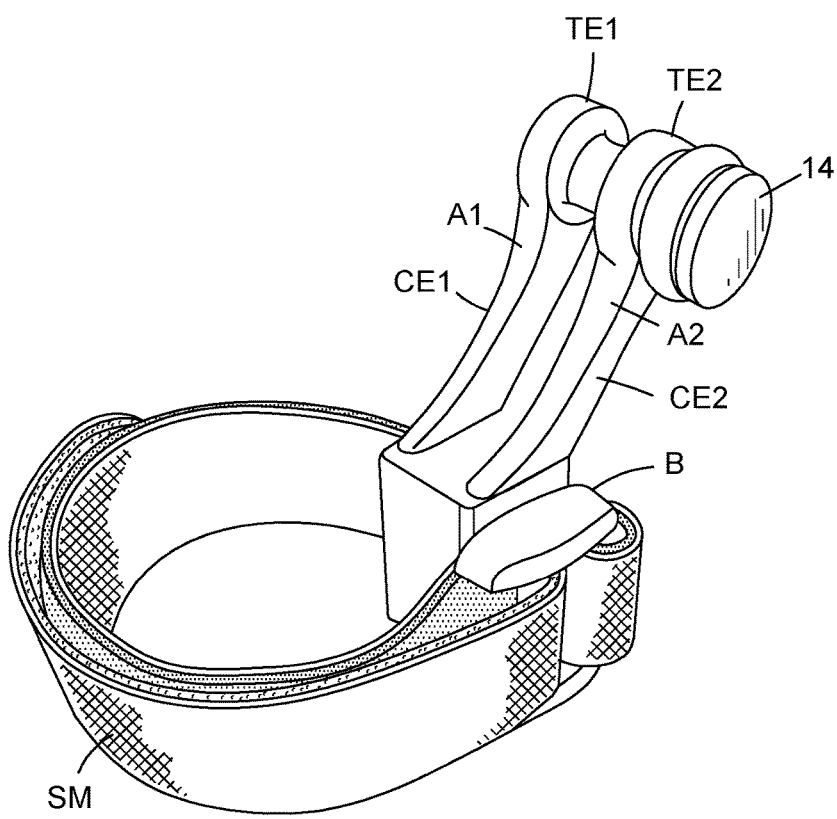
FIG. 2A is a perspective view of my detachable fishhook and line holder shown in FIG. 2 detached from the fishing pole with the opposed ends of its strap connected through a buckle.
Figure 2B:
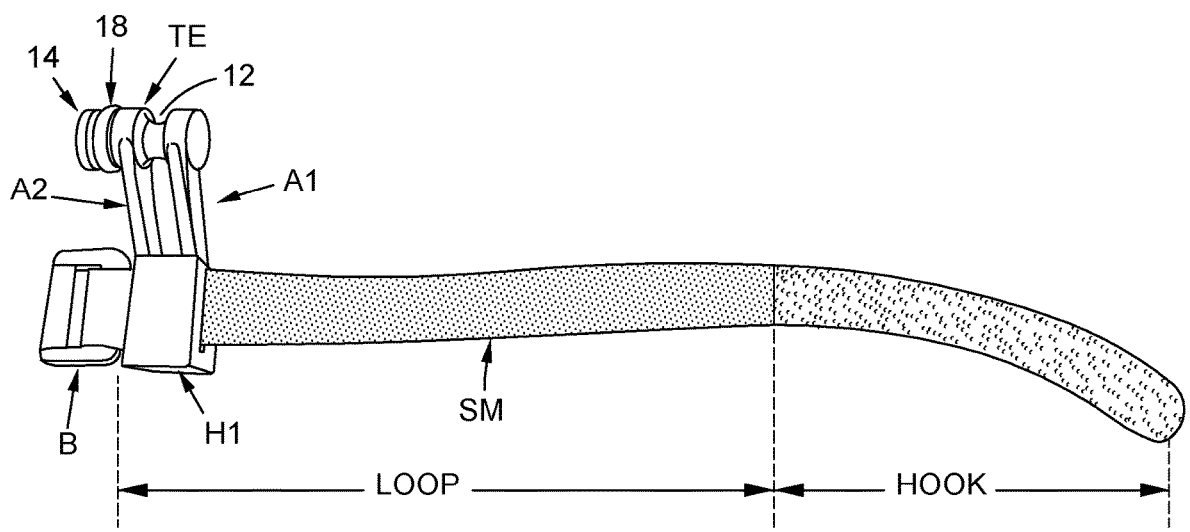
FIG. 2B is a perspective view of my detachable fishhook and line holder shown in FIG. 2 detached from the fishing pole with the opposed ends of its strap disconnected.
Figure 6A:
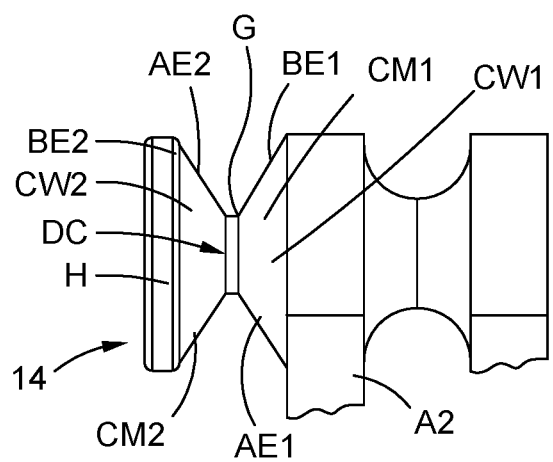
FIG. 6A is an enlarged fragmentary view of a portion of the line keeper element in my fishhook and line holder.

The hook keeper element 12 extends between the terminal ends TE1 and TE2 and has opposed ends merging, and being integral with, the opposed arms A1 and A2 at the terminal ends. As best shown in FIG. 2, the hook keeper element 12 and terminal ends TE1 and TE2 are configured to form a space that receives a portion of a fishhook gripping the hook keeper element. As best illustrated in FIG. 6A, the line keeper element 14 extends outward from the arm A2 and includes the groove G configured to retain a free end portion EP (FIG. 3) of a fishing line FL extending from the reel R. The line keeper element 14 comprises an inner and outer, generally conical members CM1 and CM2, generally of the same size and shape. Each conical member CM1 and CM2 has an apex tip end AE1 and AE2, a base end BE1 and BE2, and a conical wall CW1 and CW2 connecting the apex tip ends to the base ends. The apex tip ends AE1 and AE2 merge to form a disk connector DC between the tips, and the base of the outer conical member CM1 terminates at an enlarged head H. The apex tip ends AE1 and AE2 are integral with each other, and oriented to lie along a common reference line that is at a right angle to the arm A2. The conical walls CW1 and CW2 converge to form an annular groove G that accommodates fishing lines of different thicknesses. An elastic retention member, for example, an "O" ring 18, has a predetermined circumference that enables it to stretch, expand and slip over the outer head H of the line keeper element 14. The "O" ring 18 is then in, positioned, and seated within the groove G and contracts to fit snug within the groove and be firmly attached.

Figure 7:
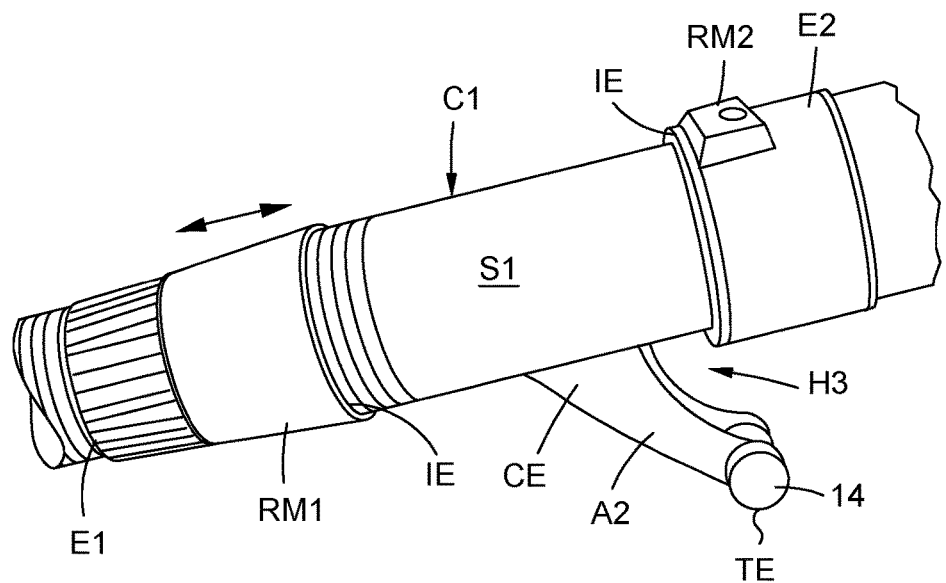
FIG. 7 is a perspective view of yet another embodiment, where a fishing pole component that is adapted to carry a fishing reel, also includes integral therewith my fishhook and line holder.
Figure 7A:
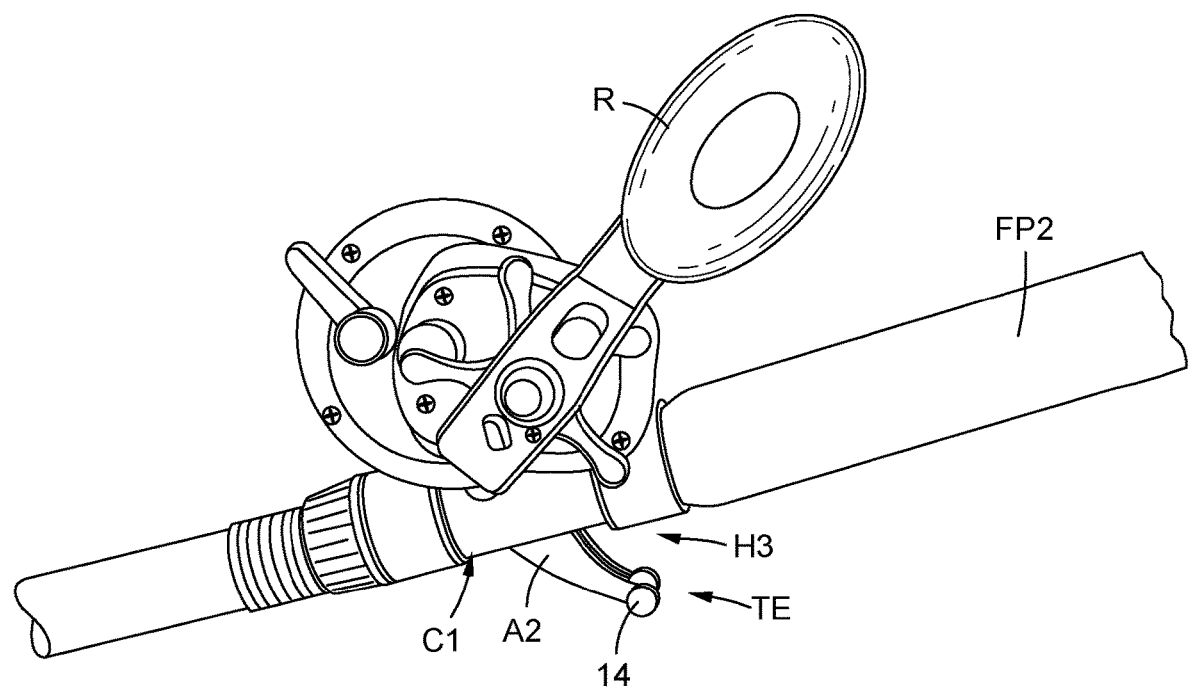
FIG. 7A is a perspective view of the embodiment shown in FIG. 7 assembled with other components of the fishing pole.
Figure 7B:
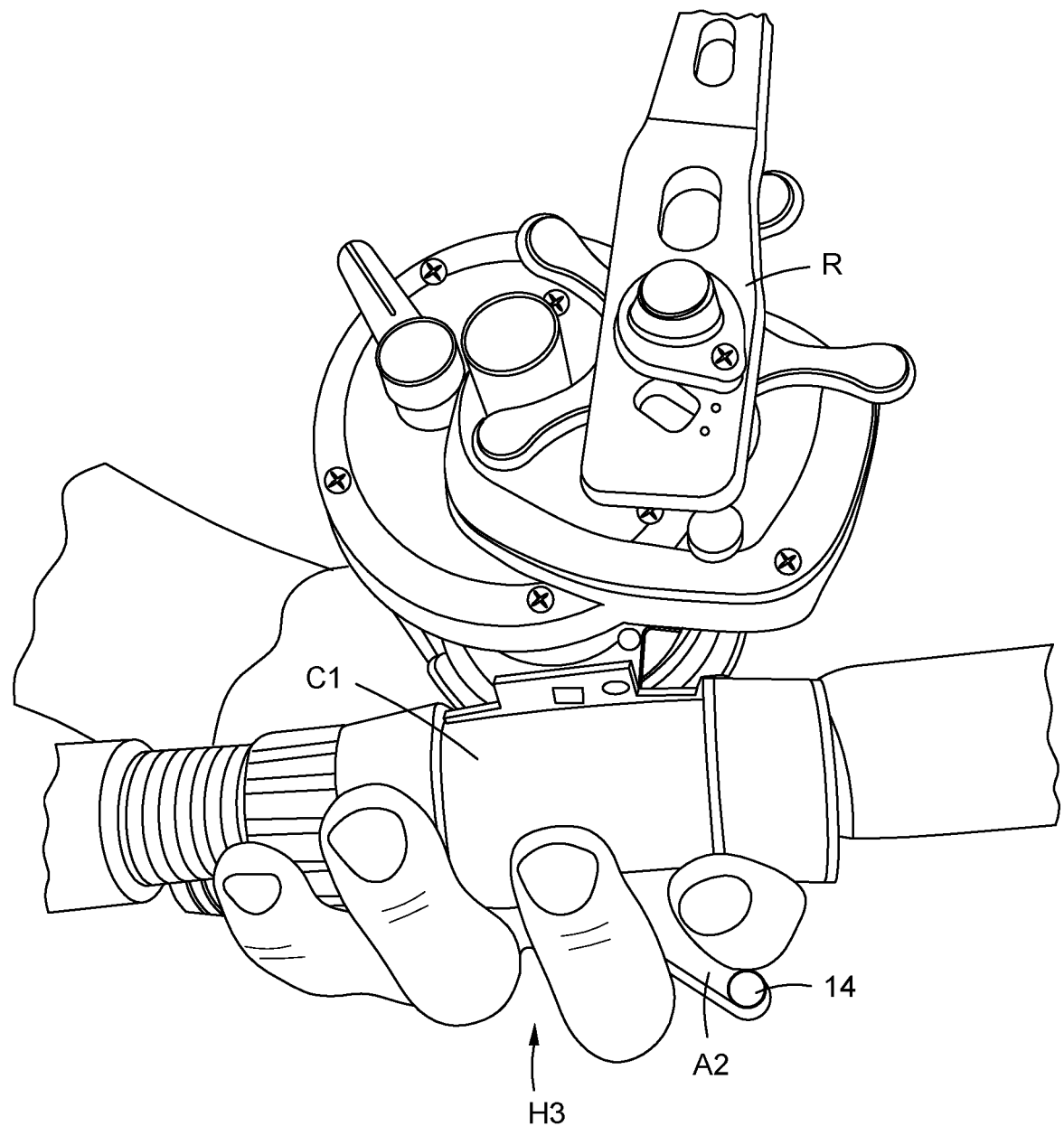
FIG. 7B is a perspective view similar to that shown in FIG. 7A with an angler holding the pole and using a finger to engage my fishhook and line holder.

FIGS. 7 through 7B

FIGS. 7 through 7B illustrate my fishing pole FP2 employing my fishhook and line holder H3 incorporated into a component C1 of the fishing pole FP2 designed to detachably mount the reel R. My fishing pole FP2 comprises a plurality of tubular components configured to be assembled into an elongated rod member, including the component C1, which is tubular. The holder H3 is similar to the other embodiment holder H1 discussed above, and it includes a hook keeper element 12 and line keeper element 14. The arms A1 each have a connection end CE (only one shown) integral with a surface S1 of the component C1 and a terminal end TE remote from the connection end CE and displaced from the surface S1. The elastic retention member 18, the "O" ring, is seated in the annular groove G. At opposed components ends E1 and E2, and near each end is a retainer member RM1 and RM2 configured to engage a reel R to be mounted to the component C1. Each inner edge IE of the retainer members RM1 and RM2 is offset slightly from the surface S1 of the component C1 to create a gap (not shown). A portion of the end E1 is threaded, and the retainer member RM1 has an internal thread. The retainer member RM2 is affixed to the end E2 and does not rotate or move lengthwise along the component C1. This enables an angler to rotate the retainer member RM1 and manually move this retainer member lengthwise along the component C1 in either a forward or reverse direction to adjust for different sized reels. Rotating the retainer members RM1 in one direction advances this retainer member towards a reel R on the reel seat. Upon mounting the reel R to the component C1, opposed finger members (not shown) of the reel R slip under the edges IE of the retainer members RM1 and RM2 into one gap.

Figure 8:
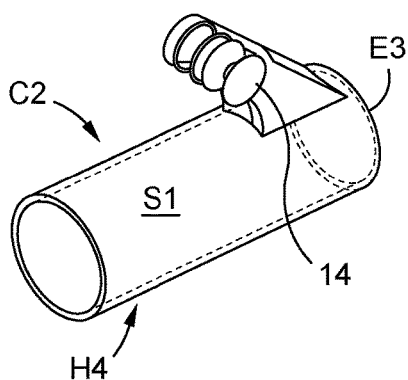
FIG. 8 is a perspective view of another embodiment of my fishhook and line holder integral with a component of the fishing pole and configured to be mounted adjacent a reel mount of the fishing pole.
Figure 8A:
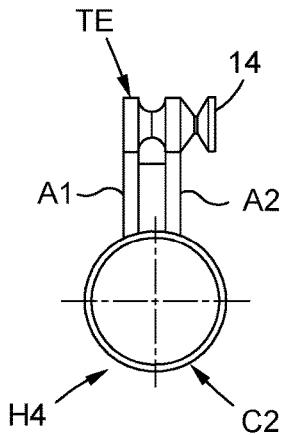
FIG. 8A is an end view of the embodiment shown in FIG. 8.
Figure 8B:
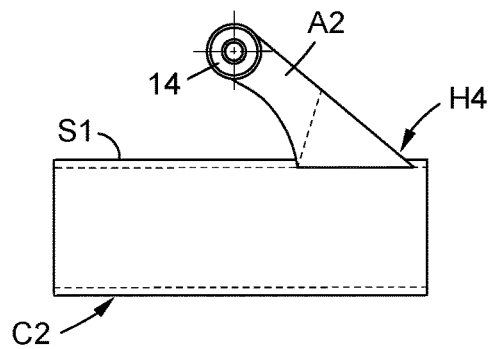
FIG. 8B is a side view of the embodiment shown in FIG. 8.
Figure 9:
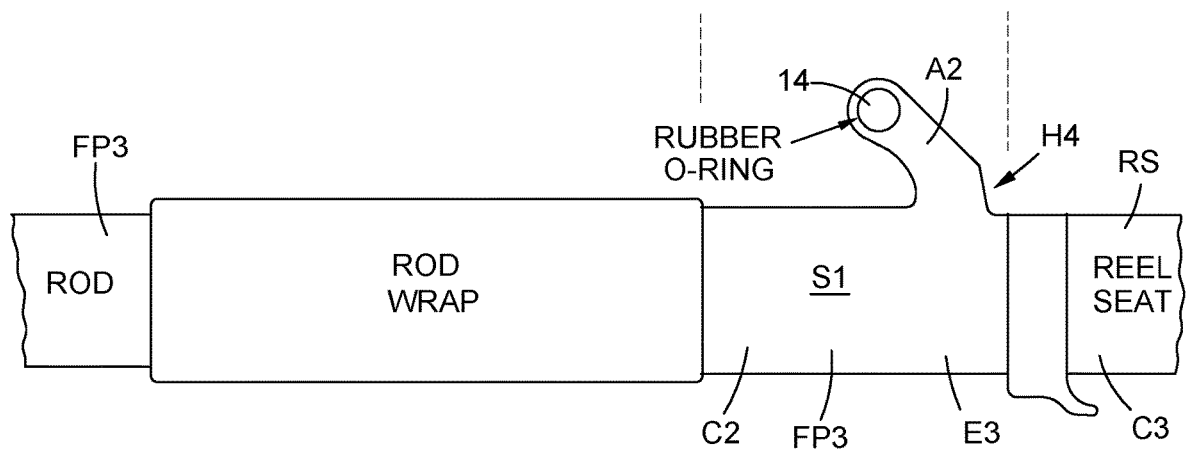
FIG. 9 is a side view of the embodiment shown in FIG. 8 assembled with other fishing pole components and connected adjacent to the reel seat of the fishing pole
Figure 10:
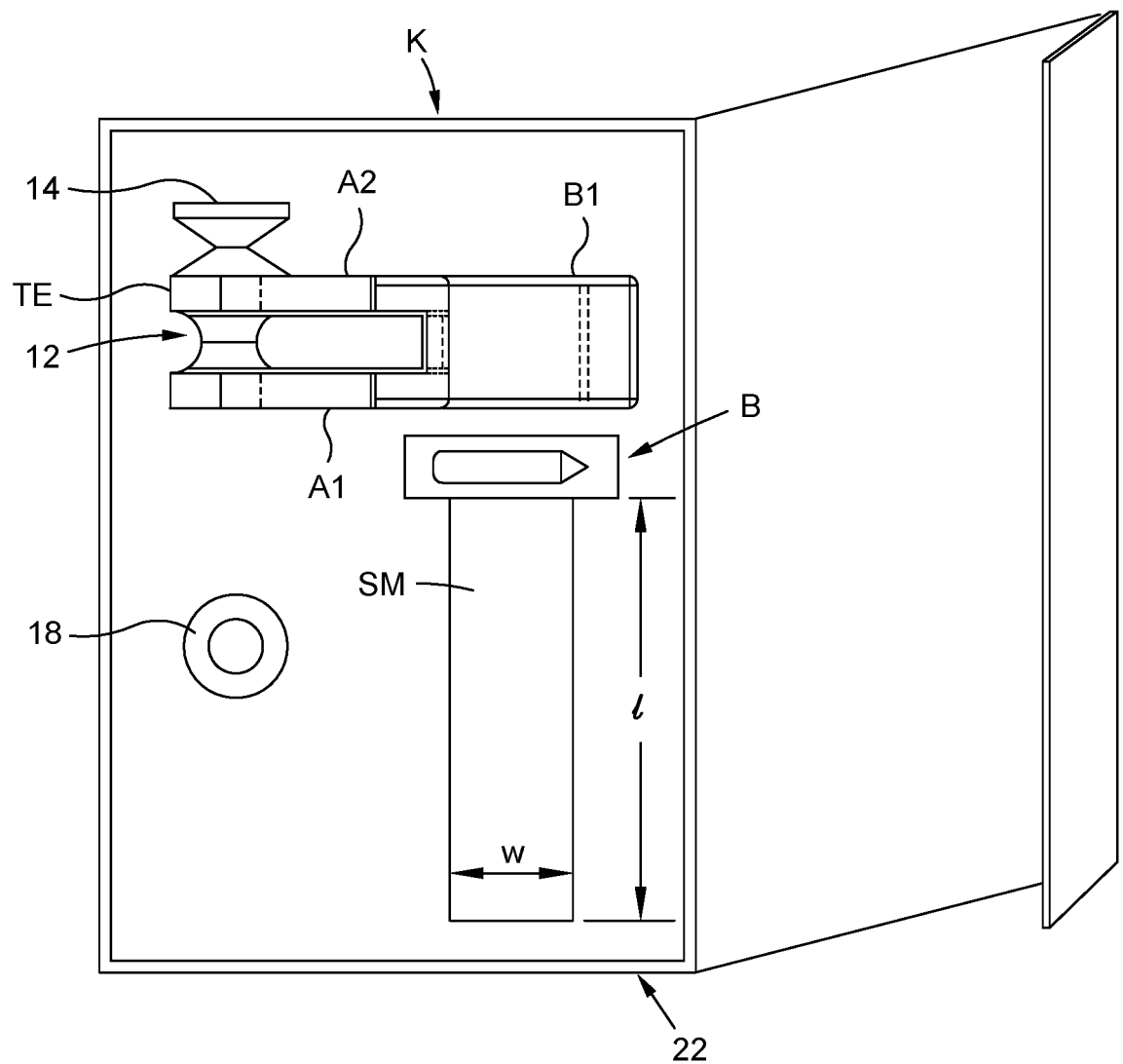
FIG. 10 is a plan view of a kit for my detachable fishhook and line holder.

FIGS. 8 through 9

FIGS. 8 through 9 illustrate my fishing pole FP3 employing my fishhook and line holder H4 incorporated into a component C2 of the fishing pole FP3. The component C2 is designed to be detachably connected to another fishing pole component C3 that includes a reel seat RS. My fishhook and line holder H4 is integral with the surface S1 of the component C2 and the component end E3 is immediately adjacent the reel seat RS. The reel R is designed to be detachably mounted to the reel seat RS.

FIG. 10

FIG. 10 illustrates a kit K for my fishhook and line holder depicted in FIGS. 1 through 6 but unassembled into its three parts: The body B1 of the holder having a hook keeper element 12 and a line keeper element 14. The "O" ring 18 configured to be detachably mounted to the line keeper element 14. The strap member SM is sized to be retained by the holder and may include a buckle B. A package 22 contains the unassembled parts of my fishhook and line holder.

FIGS. 11 through 15

Figure 11:
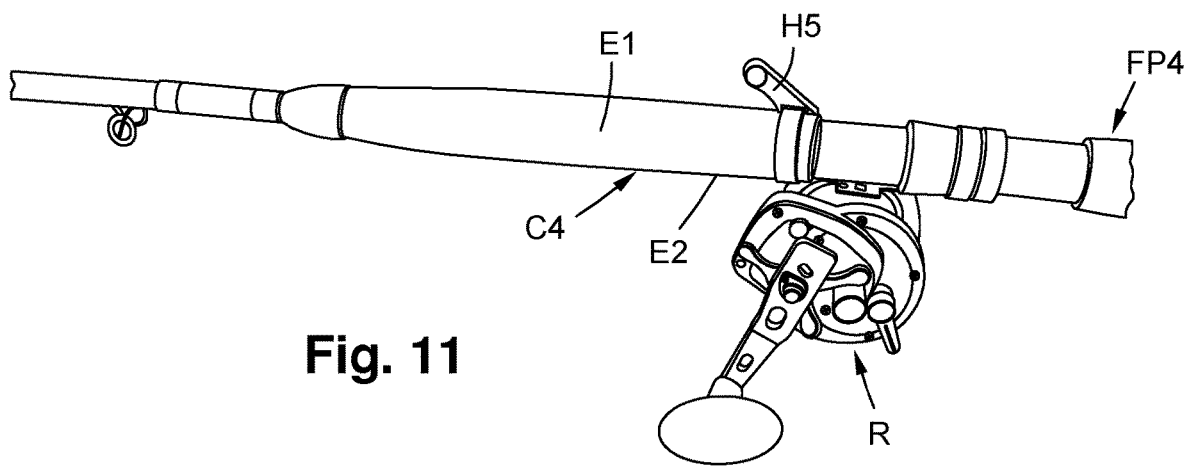
FIG. 11, similar to FIG. 7B, is a perspective view of still another embodiment of my fishhook and line holder integral with another type of detachable, fishing pole component.
Figure 12:
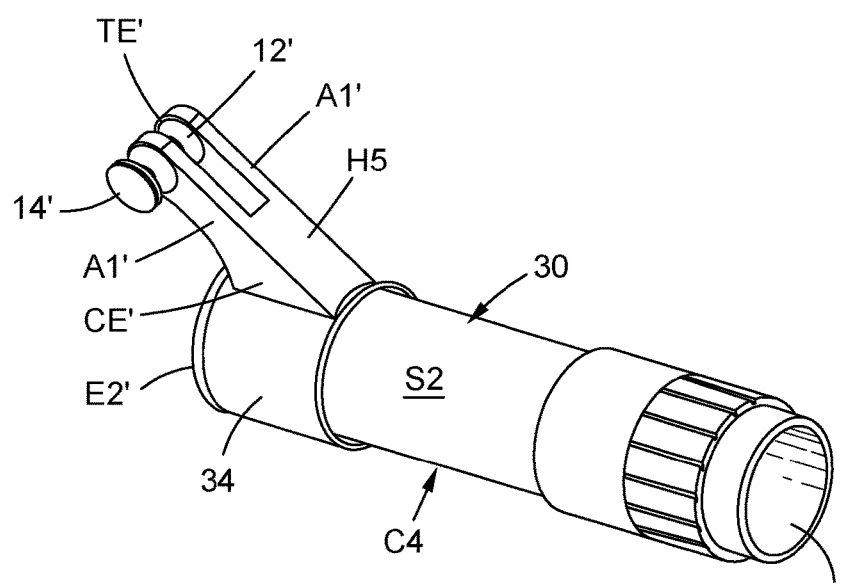
FIG. 12 is a perspective view the detachable, fishing pole component that is configured to be mounted adjacent a reel mount of a fishing pole as depicted in FIG. 11.
Figure 13:
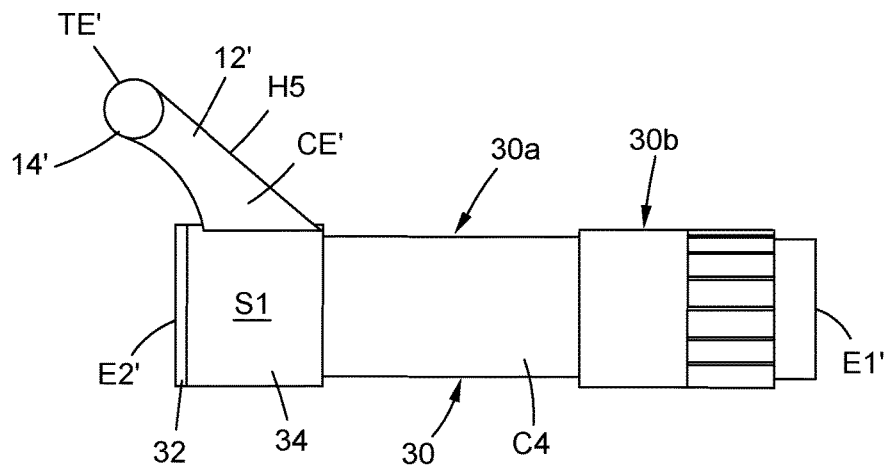
FIG. 13 is a side view of the detachable, fishing pole component shown in FIG. 12.
Figure 14:
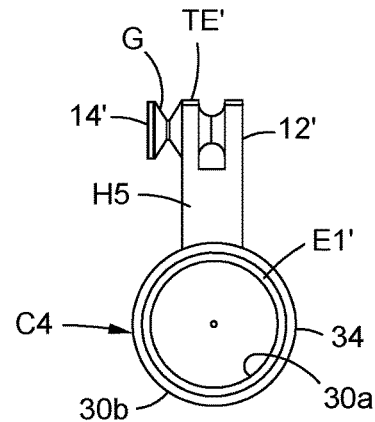
FIG. 14 is an end view of the detachable, fishing pole component shown in FIG. 12.

FIG. 11 illustrates my fishing pole FP4 employing my fishhook and line holder H5 incorporated into a component C4 of the fishing pole FP4. Component C4, like other embodiments, is designed to be detachably mounted to the reel R. My fishing pole FP4 comprises a plurality of tubular components configured to be assembled into an elongated rod member, including the component C4. This component C3 includes a conventional fishing pole component 30 and a holder H5 similar to the other embodiments discussed above.

The conventional fishing pole component 30 has a tubular, cylindrical barrel member 30a and a detachable coupling 30b with internal threaded surfaces (not shown). One end E2' has a raised circular rim 32 and its opposed end E1' is open. An exterior barrel surface S2 adjacent the end E1' is threaded S3 (FIG. 15).

The holder H5 comprises an injection molded cylindrical member 34 from which extend a hook keeper element 12' like that depicted in other embodiments. The hook keeper element 12' has arms A1' terminating at a terminal end TE' in a line keeper element 14'. The arms A1' merge into a connection end CE' integral with a surface S1' of the cylindrical member 34 and the terminal end TE' is remote from the connection end CE' and displaced from the surface S1'. Typically, the inside diameter of the cylindrical member 34 is slightly greater than the outside diameter of the cylindrical barrel member 30a, and the outside diameter of the cylindrical member 34 is equal to, or slightly less than, the diameter of the raised circular rim 32.

Figure 15:
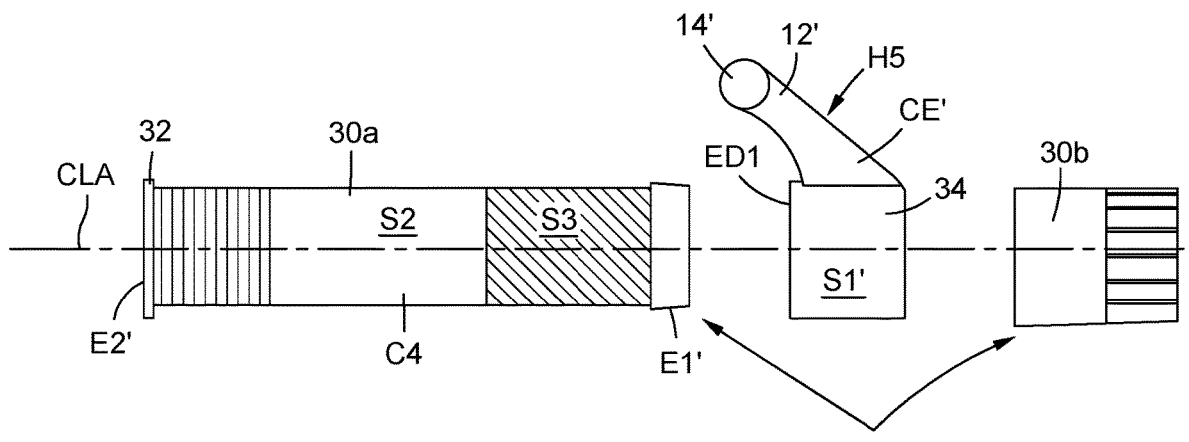
FIG. 15 is a side view showing the order of assembly of the parts of the detachable, fishing pole component shown in FIG. 12.

As illustrated FIG. 15, during assembly of the conventional fishing pole component 30 and the holder H5, the cylindrical member 34 is first aligned along a central longitudinal axis CLA of the fishing pole component. It is then advanced towards the end E2' until a leading edge ED1 of the cylindrical member abuts the circular rim 32. The terminal ends TE' of the arms A1' now extend outwardly of the end E2'. The holder H5 is next glued, sonically welded, or otherwise fastened securely in place as shown. The detached coupling 30b is lastly screwed onto the threaded surface S3 near the end E2'.

Method

Figure 3:
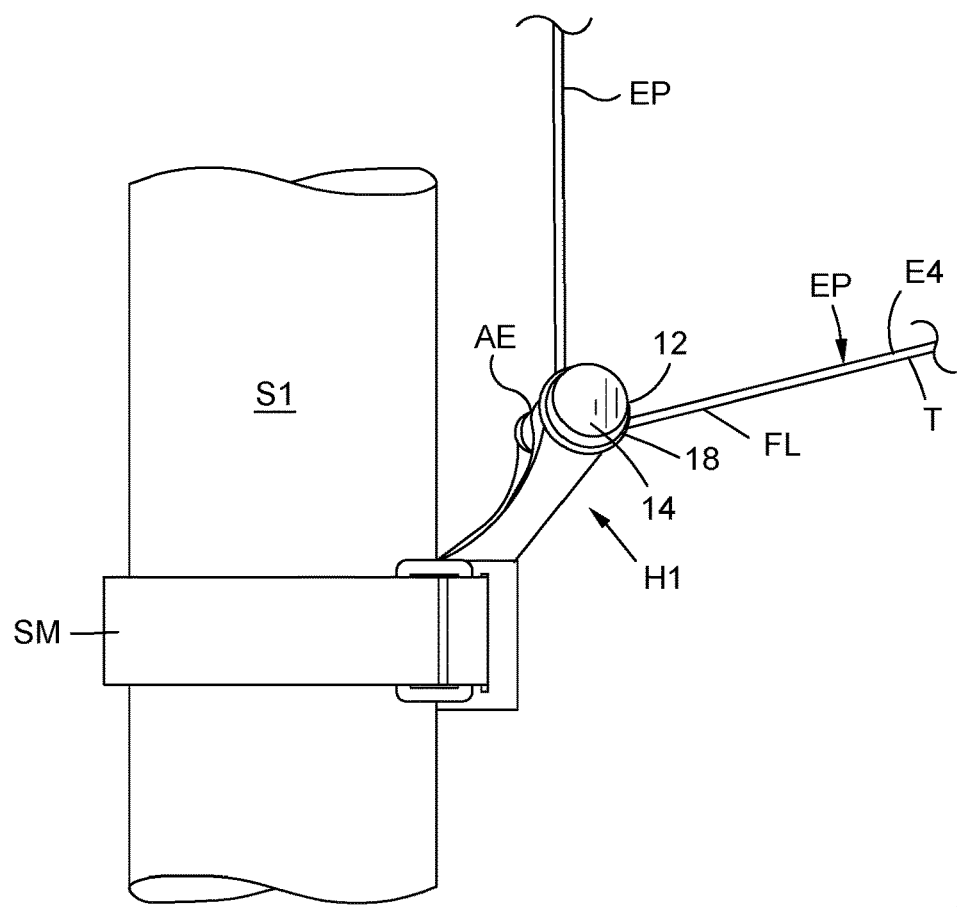
FIG. 3 is a fragmentary perspective view of my fishhook and line holder shown in FIG. 2 with the free end of the line attached to a line keeper element of my holder shown in FIG. 2.
Figure 4:
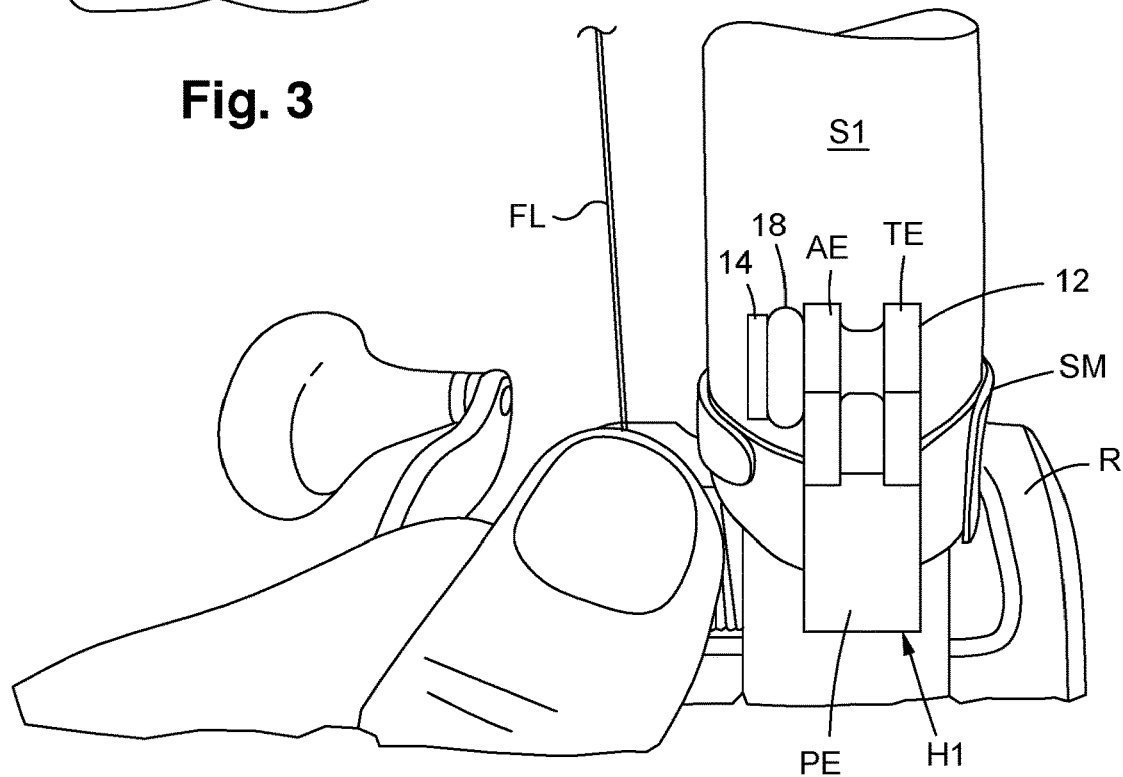
FIG. 4 is a perspective view showing a user holding a free end of a fishing line and positioning the line adjacent to my holder shown in FIG. 2.
Figure 5D:
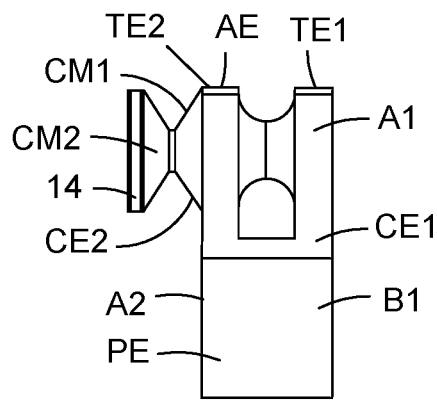
FIG. 5D is a rear end view of the embodiment of the body member of my holder shown in FIG. 5.
Figure 5E:
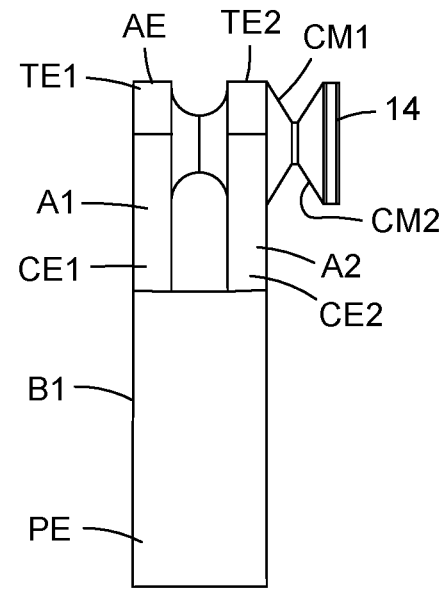
FIG. 5E is a bottom plan view of the embodiment of the body member of my holder shown in FIG. 5.

My method enables an angler to connect to a fishing pole FP a free end portion EP of a fishing line FL extending from a reel R mounted to the fishing pole. My method comprises the steps of manually gripping the free end portion EP of the fishing line FL with one hand and forcing this portion into the groove G in my fishhook and line holder H1 mounted on the fishing pole FP. As depicted in FIG. 4, a section of the free end portion EP is manually wrapped around the disk connector DC of the line keeper element 14, and the "O" ring seated in the groove G secures this free end portion EP in position. As shown in FIG. 3, an excess segment ES of the free end portion EP includes a tip T at the end E4 of the fishing line FL. With the fishing line FL so connected to the fishing pole FP as shown in FIG. 3, the angler may now attach a replacement fishing hook to the tip T. The angler can now unwind the fishing line FL from the disk connector DC of the line keeper element 14 and securely position the replacement fishing hook on the hook keeper element 12.

My fishhook and line holder eliminates the frustration of not having a convenient way to overcome the problem of a free broken or cut line when on a fishing adventure; it provides a convenient and safe way to hold a fishhook attached to the end of a line extending from a reel mounted on a fishing pole; and it protects the investment made in a reel and pole. This is because my fishhook holder keeps hooks and different sized and weighted lures in place just above the reel seat. Consequently, the lure stays up against the foam or cork rod wrap (FIG. 9). Such placement will not cause damage to the delicate graphite or glass parts of the fishing pole or fishing reel.

Scope of the Invention

The above presents a description of the best mode I contemplate of carrying out my fishhook and line holder, pole, kit, and method, and of the manner and process of making and using them, in such full, clear, concise, and exact terms as to enable a person skilled in the art to make and use. My fishhook and line holder, pole, kit, and method are, however, susceptible to modifications and alternate constructions from the illustrative embodiments discussed above which are fully equivalent. Consequently, it is not the intention to limit my fishhook and line holder, pole, kit, and method to the particular embodiments disclosed. On the contrary, my intention is to cover all modifications and alternate constructions coming within the spirit and scope of my fishhook and line holder, pole, kit, and method as generally expressed by the following claims, which particularly point out and distinctly claim the subject matter of my invention:

The invention claimed is:

1. A fishhook and line holder comprising
a body member including a platform end and an elevated arm end,
said platform end and said elevated arm end joining at a junction, merging, and being integral with each other,
said platform end configured to retain a strap member that can be wrapped around a portion of a fishing pole to which the holder is to be attached nearby a reel on the pole, to thereby detachably mount the holder to the pole,
said elevated arm end having a pair of opposed, spaced apart arms, each arm having a terminal end and a connection end, said connection ends merging and being integral with said platform end at said junction, said terminal ends being remote from said junction,
a hook keeper element extending between said terminal ends and having opposed ends merging, and being integral with, the opposed arms, said hook keeper element and terminal ends configured to form a space that receives a portion of a fishhook gripping the hook keeper element,
a line keeper element extending outward from one to the arms and including a groove configured to retain an free end portion of a fishing line extending from the reel, and
an elastic retention member is seated in the groove.

2. The fishing pole of claim 1 where the groove is annular and the elastic retention member is an "O" ring seated in the annular groove.

3. The fishhook and line holder of claim 1 where the arms are parallel and generally of the same length.

4. The fishhook and line holder of claim 3 where the arms have a length from ½ to ¾ inches and are spaced apart a distance from ⅛ to ¼ inch.

5. The fishhook and line holder of claim 1 where the arms form an acute angle at the junction between the pole and the arms.

6. The fishhook and line holder of claim 1 where the line keeper element comprise
a pair of generally conical members, each conical member having an apex tip end, a base end, and a conical wall connecting said apex tip end to the base end,
said apex ends merging, being integral with each other, and oriented to lie alone a common reference line that is at a right angle to said one arm,
said conical walls converging to form an annular groove having a predetermined circumference that accommodates fishing lines of different thicknesses.

7. The fishhook and line holder of claim 1 where the body is a rigid, solid unitary component of a molded plastic.

8. The fishhook and line holder of claim 1 where the platform end configured to retain a strap member includes an open channel that receives a central segment of a strap member.

9. The fishhook and line holder of claim 1 where the platform end configured to retain a strap member includes a passageway open at opposed ends through which a strap member can extend.

10. A fishhook and line holder comprising
a body member including a platform end and an elevated arm end, said body being a rigid, solid, unitary component,
said platform end and said elevated arm end joining at a junction, merging, and being integral with each other,
said platform end configured to retain a strap member that can be wrapped around a portion of a fishing pole to which the holder is to be attached nearby a reel on the pole, to thereby detachably mount the holder to the pole,
said elevated arm end having a pair of opposed, spaced apart arms, each arm having a terminal end and a connection end, said connection ends merging and being integral with said platform end at said junction, said terminal ends being remote from said junction,
said arms being parallel and generally of the same length and forming an acute angle at the junction between the pole and the arms that is from 3 to 50 degrees,
a hook keeper element extending between said terminal ends and having opposed ends merging, and being integral with, the opposed arms, said hook keeper element and terminal ends configured to form a space that receives a portion of a fishhook gripping the hook keeper element,
a line keeper element extending outward from one to the arms and including an annular groove configured to retain an free end portion of a fishing line extending from the reel, and
an "O" ring seated in the groove.

11. A fishing pole comprising
a plurality of components configured to be assembled into an elongated rod member, one of said components including
a pair opposed arms, each arm having a connection end integral with said one component and a terminal end remote from said connection end,
a hook keeper element extending between said terminal ends and having opposed ends merging, and being integral with, the opposed arms, said hook keeper element and ends configured to form a space that receives a portion of a fishhook gripping the hook keeper element,
a line keeper element extending outward from one to the arms and including a groove configured to retain a free end portion of a fishing line extending from the reel, and
an elastic retention member is seated in the groove.

12. The fishing pole of claim 11 where the groove is annular and the elastic retention member is an "O" ring seated in the annular groove.

13. The fishing pole of claim 11 where the said one component includes opposed ends, and near each end is a retainer member configured to engage a reel to be mounted to said one component.

14. The fishing pole of claim 11 where one of said retainer members is manually moveable lengthwise to adjust for different sized reels.

15. A fishing pole component including
a tubular member having opposed ends, and near each end is a retainer member configured to engage a reel to be mounted to said tubular, one of said retainer members being manually moveable lengthwise to adjust for different sized reels,
a pair of parallel, opposed, spaced apart arms, each arm having a connection end integral with an exterior surface of the tubular member and a terminal end remote from said connection end, a hook keeper element extending between said terminal ends and having opposed ends merging, and being integral with, the opposed arms, said hook keeper element and ends configured to form a space that receives a portion of a fishhook gripping the hook keeper element, a line keeper element extending outward from one to the arms and including a groove configured to retain a free end portion of a fishing line extending from the reel, and an elastic retention member is seated in the groove.

16. The fishing pole of claim 15 where the groove is annular and the elastic retention member is an "O" ring seated in the annular groove.

17. A body of a fishhook and line holder comprising including a platform end and an elevated arm end, said platform end and said elevated arm end joining at a junction, merging, and being integral with each other, said platform end configured to retain a strap member that can be wrapped around a portion of a fishing pole to which the holder is to be attached nearby a reel on the pole, to thereby detachably mount the holder to the pole, said elevated arm end having a pair opposed arms, each arm having a terminal end and a connection end, said connection ends merging and being integral with said platform end at said junction, said terminal ends being remote from said junction, a hook keeper element extending between said terminal ends and having opposed ends merging, and being integral with, the opposed arms, said hook keeper element and terminal ends configured to form a space that receives a portion of a fishhook gripping the hook keeper element, and a line keeper element extending outward from one to the arms and including a groove configured to retain a free end portion of a fishing line extending from the reel.

* * * * *